(12) United States Patent
Han et al.

(10) Patent No.: US 9,539,775 B2
(45) Date of Patent: Jan. 10, 2017

(54) DEVICE AND METHOD FOR BONDING AUXILIARY SECONDARY BARRIER FOR LIQUEFIED NATURAL GAS STORAGE TANK

(71) Applicant: SAMSUNG HEAVY IND. CO., LTD, Seoul (KR)

(72) Inventors: Sungjong Han, Seoul (KR); Minhong Kim, Gyeongsangnam-do (KR); Jongho Kim, Gyeongsangnam-do (KR); HongGyeoum Kim, Daejeon (KR)

(73) Assignee: SAMSUNG HEAVY IND. CO., LTD, Seoul (KR)

( * ) Notice: Subject to any disclaimer, the term of this patent is extended or adjusted under 35 U.S.C. 154(b) by 115 days.

(21) Appl. No.: 14/360,977

(22) PCT Filed: Dec. 18, 2012

(86) PCT No.: PCT/KR2012/011095
§ 371 (c)(1),
(2) Date: May 28, 2014

(87) PCT Pub. No.: WO2013/094974
PCT Pub. Date: Jun. 27, 2013

(65) Prior Publication Data
US 2014/0326406 A1 Nov. 6, 2014

(30) Foreign Application Priority Data

Dec. 20, 2011 (KR) .................. 10-2011-0138692
Dec. 14, 2012 (KR) .................. 10-2012-0146815

(51) Int. Cl.
*B29C 65/00* (2006.01)
*B29D 22/00* (2006.01)
(Continued)

(52) U.S. Cl.
CPC ........... *B29D 22/003* (2013.01); *B29C 66/865* (2013.01); *B63B 9/06* (2013.01); *B63B 25/16* (2013.01);
(Continued)

(58) Field of Classification Search
CPC .... B63B 9/06; B29C 65/865; B29C 65/86521; B29C 65/86531; B29C 65/86533; B29C 65/86535; B29C 66/865; B29C 66/86521; B29C 66/86531; B29C 66/86533; B29C 66/86535; B29C 65/20; Y10T 156/1795; B29D 22/003
(Continued)

(56) References Cited

U.S. PATENT DOCUMENTS 4,629,094 A * 12/1986 Vogel ...................... E04D 15/07
                                                    222/146.5
6,155,321 A * 12/2000 Bindschedler .......... E01C 23/03
                                                    156/497

FOREIGN PATENT DOCUMENTS

CN    1377807 A    11/2002
CN    1898124 A    1/2007
(Continued)

OTHER PUBLICATIONS

Machine translation of KR 100928316 date unknown.*
(Continued)

*Primary Examiner* — John Goff
(74) *Attorney, Agent, or Firm* — Carter, DeLuca, Farrell & Schmidt, LLP

(57) ABSTRACT

Disclosed are a device and a method for bonding an auxiliary secondary barrier for an LNG storage tank. The device for bonding an auxiliary secondary barrier includes: a frame; a driving unit, a portion of which is arranged in the frame, and which enables the frame to move on an upper heat insulation board corresponding to an exposed portion of a
(Continued)

main secondary barrier; an adhesive applying unit arranged in the frame to apply an adhesive on the exposed portion; an auxiliary secondary barrier supply unit arranged in the frame to supply an auxiliary secondary barrier on the adhesive applied on the exposed portion; and one or more heating unit arranged in the frame to heat at least one of the exposed portion to which the adhesive contained in the adhesive applying unit is to be applied and the auxiliary secondary barrier to be supplied on the applied adhesive.

7 Claims, 18 Drawing Sheets

(51) Int. Cl.
  *B63B 9/06* (2006.01)
  *B63B 25/16* (2006.01)
  *F17C 13/00* (2006.01)
(52) U.S. Cl.
  CPC ..... *F17C 13/004* (2013.01); *F17C 2203/0358* (2013.01); *F17C 2209/227* (2013.01); *F17C 2221/033* (2013.01); *F17C 2223/0161* (2013.01); *F17C 2265/05* (2013.01); *F17C 2270/0105* (2013.01); *F17C 2270/0107* (2013.01); *F17C 2270/0113* (2013.01); *Y10T 156/10* (2015.01); *Y10T 156/1744* (2015.01); *Y10T 156/1795* (2015.01)

(58) Field of Classification Search
  USPC ................................ 156/322, 497, 575, 577
  See application file for complete search history.

(56) References Cited

FOREIGN PATENT DOCUMENTS

| | | | | |
|---|---|---|---|---|
| JP | 2007-063873 | A | | 3/2007 |
| KR | 20020076193 | A | * | 10/2002 ............. B29C 65/10 |
| KR | 20050015840 | A | | 2/2005 |
| KR | 10-0557354 | B1 | | 3/2006 |
| KR | 20060078998 | A | | 7/2006 |
| KR | 10-0626486 | B1 | | 9/2006 |
| KR | 10-0631131 | B1 | | 10/2006 |
| KR | 100860943 | B1 | * | 9/2008 |
| KR | 10-2008-0095631 | A | | 10/2008 |
| KR | 1020090004182 | A | | 1/2009 |
| KR | 10-0928316 | B1 | | 11/2009 |
| KR | 10-2010-0029965 | A | | 3/2010 |
| KR | 10-0991275 | B1 | | 11/2010 |

OTHER PUBLICATIONS

Machine translation of KR 100860943 date unknown.*
Machine translation KR 2002-0076193 date unknown.*
International Search Report issued in corresponding application No. PCT/KR2012/011095 mailed Apr. 16, 2013.

* cited by examiner

DEVICE AND METHOD FOR BONDING AUXILIARY SECONDARY BARRIER FOR LIQUEFIED NATURAL GAS STORAGE TANK

TECHNICAL FIELD

The present invention relates to a device and method for bonding an auxiliary secondary barrier for a liquefied natural gas storage tank.

BACKGROUND ART

A liquefied natural gas (LNG) is in a colorless liquid state in which a natural gas containing methane as a main component is cooled at a temperature of −163° C. to reduce a volume thereof to 1/600. LNG storage tanks for storing an LNG are manufactured with a structure and material which endures an ultralow temperature for gas liquefaction.

Such an LNG storage tank, for example, has a dual sealing structure including a primary barrier, an upper heat insulation board, and a lower heat insulation board. The primary barrier contacts an LNG to primarily seal the LNG. The secondary barrier secondarily seals a leaking LNG when the LNG leaks through the primary barrier to prevent the LNG to contacting an inner hull.

The secondary barrier includes main secondary barriers and auxiliary secondary barriers. The main secondary barrier is disposed on the lower heat insulation board in parallel with the lower heat insulation board with a gap therebetween. The auxiliary secondary barrier is attached to the main secondary barriers between the upper heat insulation boards while covering a gap between the main secondary barriers. The secondary barrier may be secured in sealing property by the auxiliary secondary barriers.

In installation of the conventional auxiliary secondary barrier, an adhesive is applied to an edge of the main secondary barrier, and the auxiliary secondary barrier and a protection sheet are disposed on the adhesive. Then, the auxiliary secondary barrier is pressed by using a heating skate plate or hot pad to cure the adhesive. A prior document related to the above-described installation process is disclosed in Korean Registration Patent No. 0928316.

DISCLOSURE

Technical Problem

The present invention provides a device and method for bonding an auxiliary secondary barrier for a liquefied natural gas storage tank, which firmly bond the auxiliary secondary barrier to a main secondary barrier without pressing the auxiliary secondary barrier by using a heating skate plate or hot pad.

Technical Solution

An embodiment of the present invention provides a device for bonding an auxiliary secondary barrier to exposed portion of a main secondary barrier, which are exposed between upper heat insulation boards adjacent to each other and spaced apart from each other in a liquefied natural gas (LNG) storage tank including a lower heat insulation board, the main secondary barrier, and upper heat insulation boards which are successively stacked between an inner hull and a primary barrier, the device including: a frame; a driving unit of which a portion is mounted on the frame, the driving unit allowing the frame to move on the upper heat insulation boards corresponding to the exposed portion of the main secondary barrier; an adhesive applying unit mounted on the frame to apply an adhesive onto the exposed portion; an auxiliary secondary barrier supply unit mounted on the frame to supply the auxiliary secondary barrier onto the applied adhesive; and at least one heating unit disposed on the frame to heat at least one of the adhesive embedded in the adhesive applying unit, the exposed portion to be applied with the embedded adhesive, and the auxiliary secondary barrier to be supplied on the applied adhesive.

An embodiment of the present invention provides a device for bonding an auxiliary secondary barrier to exposed portion of a main secondary barrier, which are exposed between upper heat insulation boards adjacent to each other and spaced apart from each other in an LNG storage tank including a lower heat insulation board, the main secondary barrier, and upper heat insulation boards which are successively laminated between an inner hull and a primary barrier, the device including: a frame; a driving unit of which a portion is mounted on the frame, the driving unit allowing the frame to move on the upper heat insulation boards corresponding to the exposed portion of the main secondary barrier; a heater disposed on the frame to heat the exposed portion; an adhesive applying unit mounted on the frame to apply an adhesive onto the heated exposed portion; and an auxiliary secondary barrier supply unit mounted on the frame to supply the auxiliary secondary barrier onto the applied adhesive.

An embodiment of the present invention provides a device for bonding an auxiliary secondary barrier to exposed portion of a main secondary barrier, which are exposed between upper heat insulation boards adjacent to each other and spaced apart from each other in an LNG storage tank including a lower heat insulation board, the main secondary barrier, and upper heat insulation boards which are successively stacked between an inner hull and a primary barrier, the device including: a frame; a driving unit of which a portion is mounted on the frame, the driving unit allowing the frame to move on the upper heat insulation boards corresponding to the exposed portion of the main secondary barrier; an adhesive applying unit mounted on the frame to apply an adhesive onto the exposed portion; an auxiliary secondary barrier supply unit mounted on the frame to supply the auxiliary secondary barrier onto the applied adhesive; and a heater disposed on the frame to heat the auxiliary secondary barrier to be supplied on the applied adhesive before the auxiliary secondary barrier is supplied onto the applied adhesive.

An embodiment of the present invention provides a device for bonding an auxiliary secondary barrier to exposed portion of a main secondary barrier, which are exposed between upper heat insulation boards adjacent to each other and spaced apart from each other in an LNG storage tank including a lower heat insulation board, the main secondary barrier, and upper heat insulation boards which are successively stacked between an inner hull and a primary barrier, the device including: a frame; a driving unit of which a portion is mounted on the frame, the driving unit allowing the frame to move on the upper heat insulation boards corresponding to the exposed portion of the main secondary barrier; an adhesive applying unit mounted on the frame and including a heating part for heating an adhesive to be applied on the exposed portion, the adhesive applying unit applying the heated adhesive on the exposed portion; and an auxiliary secondary barrier supply unit mounted on the frame to supply the auxiliary secondary barrier onto the applied adhesive.

An embodiment of the present invention provides a device for bonding an auxiliary secondary barrier to exposed portion of a main secondary barrier, which are exposed between upper heat insulation boards adjacent to each other and spaced apart from each other in an LNG storage tank including a lower heat insulation board, the main secondary barrier, and upper heat insulation boards which are successively stacked between an inner hull and a primary barrier, the device including: a frame; a driving unit of which a portion is mounted on the frame, the driving unit allowing the frame to move on the upper heat insulation boards corresponding to the exposed portion of the main secondary barrier; a first heater disposed on the frame to heat the exposed portion; an adhesive applying unit mounted on the frame to apply an adhesive on the heated exposed portion; an auxiliary secondary barrier supply unit mounted on the frame to supply the auxiliary secondary barrier on the applied adhesive; and a second heater disposed on the frame to heat the auxiliary secondary barrier to be supplied onto the applied adhesive before the auxiliary secondary barrier is supplied onto the applied adhesive.

An embodiment of the present invention provides a device for bonding an auxiliary secondary barrier to exposed portion of a main secondary barrier, which are exposed between upper heat insulation boards adjacent to each other and spaced apart from each other in an LNG storage tank including a lower heat insulation board, the main secondary barrier, and upper heat insulation boards which are successively stacked between an inner hull and a primary barrier, the device including: a frame; a driving unit of which a portion is mounted on the frame, the driving unit allowing the frame to move on the upper heat insulation boards corresponding to the exposed portion of the main secondary barrier; a heater disposed on the frame to heat the exposed portion; an adhesive applying unit mounted on the frame and including a heating part for heating an adhesive to be applied on the heated exposed portion, the adhesive applying unit applying the heated adhesive on the heated exposed portion; and an auxiliary secondary barrier supply unit mounted on the frame to supply the auxiliary secondary barrier onto the applied adhesive.

An embodiment of the present invention provides a device for bonding an auxiliary secondary barrier to exposed portion of a main secondary barrier, which are exposed between upper heat insulation boards adjacent to each other and spaced apart from each other in an LNG storage tank including a lower heat insulation board, the main secondary barrier, and upper heat insulation boards which are successively stacked between an inner hull and a primary barrier, the device including: a frame; a driving unit of which a portion is mounted on the frame, the driving unit allowing the frame to move on the upper heat insulation boards corresponding to the exposed portion of the main secondary barrier; an adhesive applying unit mounted on the frame and including a heating part for heating an adhesive to be applied on the exposed portion, the adhesive applying unit applying the heated adhesive on the exposed portion; an auxiliary secondary barrier supply unit mounted on the frame to supply the auxiliary secondary barrier onto the applied adhesive; and a heater disposed on the frame to heat the auxiliary secondary barrier to be supplied on the applied adhesive before the auxiliary secondary barrier is supplied onto the applied adhesive.

An embodiment of the present invention provides a device for bonding an auxiliary secondary barrier to exposed portion of a main secondary barrier, which are exposed between upper heat insulation boards adjacent to each other and spaced apart from each other in an LNG storage tank including a lower heat insulation board, the main secondary barrier, and upper heat insulation boards which are successively stacked between an inner hull and a primary barrier, the device including: a frame; a driving unit of which a portion is mounted on the frame, the driving unit allowing the frame to move on the upper heat insulation boards corresponding to the exposed portion of the main secondary barrier; a first heater disposed on the frame to heat the exposed portion; an adhesive applying unit mounted on the frame and including a heating part for heating an adhesive to be applied on the heated exposed portion, the adhesive applying unit applying the heated adhesive on the heated exposed portion; an auxiliary secondary barrier supply unit mounted on the frame to supply the auxiliary secondary barrier onto the applied adhesive; and a second heater disposed on the frame to heat the auxiliary secondary barrier to be supplied onto the applied adhesive before the auxiliary secondary barrier is supplied onto the applied adhesive.

The heater may be mounted at a front side of the frame when viewed in a moving direction of the device.

The heater may be maintained in the state where the heater is spaced apart from the exposed portion and may heat the exposed portion by using at least one of conduction, convection, and radiant heat.

The heater may include at least one of a heating plate connected to a second press part and a hot air nozzle connected to a blower to receive hot air.

The auxiliary secondary barrier supply unit may include a central shaft member winding the auxiliary secondary barrier in a roll shape and may further a protection sheet cartridge winding a protection sheet, which covers an edge and an outside of the auxiliary secondary barrier, in a roll shape.

The heater may be disposed at a front side of the auxiliary secondary barrier when viewed in a moving direction of the device to heat a surface which adheres to the applied adhesive between both surfaces of the auxiliary secondary barrier.

Another embodiment of the present invention provides a method for bonding an auxiliary secondary barrier by using the device for bonding the auxiliary secondary barrier for the LNG storage tank, the method including: a first process of heating an exposed portion of a main secondary barrier to which an adhesive is applied to provide heat for curing the adhesive; a second process of applying the adhesive on the heated exposed portion to heat the adhesive to a curing temperature of the adhesive; a third process of providing the auxiliary secondary barrier on the applied adhesive; and a fourth process of pressing the auxiliary secondary barrier to attach the auxiliary secondary barrier on the exposed portion.

In the second process, the adhesive may be applied in a state where the adhesive is heated by an adhesive applying unit including a heating part.

Another embodiment of the present invention provides a method for bonding an auxiliary secondary barrier by using the device for bonding the auxiliary secondary barrier for the LNG storage tank, the method including: applying an adhesive on an exposed portion of a main secondary barrier; heating the auxiliary secondary barrier to be supplied on the applied adhesive before the auxiliary secondary barrier is supplied on the applied adhesive; supplying the heated auxiliary secondary barrier on the applied adhesive; and pressing the supplied auxiliary secondary barrier to attach the auxiliary secondary barrier to the exposed portion.

Another embodiment of the present invention provides a method for bonding an auxiliary secondary barrier by using the device for bonding the auxiliary secondary barrier for the LNG storage tank, the method including: heating an adhesive to be applied on an exposed portion of a main secondary barrier; applying the heated adhesive on the exposed portion; providing the auxiliary secondary barrier on the applied adhesive; and pressing the auxiliary secondary barrier to attach the auxiliary secondary barrier to the exposed portion.

Another embodiment of the present invention provides a method for bonding an auxiliary secondary barrier by using the device for bonding the auxiliary secondary barrier for the LNG storage tank, the method including: heating an exposed portion of a main secondary barrier to which an adhesive is applied to provide heat required for curing the adhesive; applying the adhesive on the heated exposed portion to heat the adhesive at a curing temperature of the adhesive; heating the auxiliary secondary barrier to be supplied on the applied adhesive before the auxiliary secondary barrier is supplied on the applied adhesive; supplying the heated auxiliary secondary barrier on the applied adhesive; and pressing the auxiliary secondary barrier to attach the auxiliary secondary barrier to the exposed portion.

Another embodiment of the present invention provides a method for bonding an auxiliary secondary barrier by using the device for bonding the auxiliary secondary barrier for the LNG storage tank, the method including: heating an adhesive to be applied on an exposed portion of a main secondary barrier; applying the heated adhesive on the exposed portion; heating the auxiliary secondary barrier to be supplied on the applied adhesive before the auxiliary secondary barrier is supplied on the applied adhesive; supplying the heated auxiliary secondary barrier on the applied adhesive; and pressing the supplied auxiliary secondary barrier to attach the auxiliary secondary barrier to the exposed portion.

Another embodiment of the present invention provides a method for bonding an auxiliary secondary barrier by using the device for bonding the auxiliary secondary barrier for the LNG storage tank, the method including: heating an exposed portion of a main secondary barrier to which an adhesive is applied to provide heat required for curing the adhesive; heating an adhesive to be applied on the heated exposed portion; applying the heated adhesive on the heated exposed portion to heat the adhesive to a curing temperature of the adhesive; heating the auxiliary secondary barrier to be supplied on the applied adhesive before the auxiliary secondary barrier is supplied on the applied adhesive; supplying the heated auxiliary secondary barrier on the applied adhesive; and pressing the supplied auxiliary secondary barrier to attach the auxiliary secondary barrier to the exposed portion.

Advantageous Effects

According to the embodiment of the present invention, the auxiliary secondary barrier may firmly adhere to the main secondary barrier without pressing the auxiliary secondary barrier by using the heating skate plate or hot pad.

According to the embodiment of the present invention, the adhesive discharged from the adhesive applying unit may receive heat from the main secondary barrier after being discharged and thus be heated at a temperature greater than the curing temperature thereof. The auxiliary secondary barrier may firmly adhere to the main secondary barrier by only providing the auxiliary secondary barrier on the adhesive and pressing the auxiliary secondary barrier.

According to another embodiment of the present invention, since the auxiliary secondary barrier to be supplied on the adhesive that is applied on the exposed portion of the main secondary barrier is previously heated, the auxiliary secondary barrier may firmly adhere to the main secondary barrier even if only a pressure is applied after the heated auxiliary secondary barrier is provided on the applied adhesive.

According to further another embodiment of the present invention, since the adhesive embedded in the adhesive applying unit is heated at the temperature greater than the curing temperature thereof, the auxiliary secondary barrier may firmly adhere to the main secondary barrier as long as a pressure is applied after the auxiliary secondary barrier is provided on the adhesive applied on the exposed portion of the main secondary barrier.

MODE FOR INVENTION

Hereinafter, preferred embodiments of the present invention will be described in detail with reference to the accompanying drawings in such a manner that the technical idea of the present invention may easily be carried out by a person with ordinary skill in the art to which the invention pertains. The present disclosure may, however, be embodied in different forms and should not be construed as limited to the embodiments set forth herein.

Figure 1:
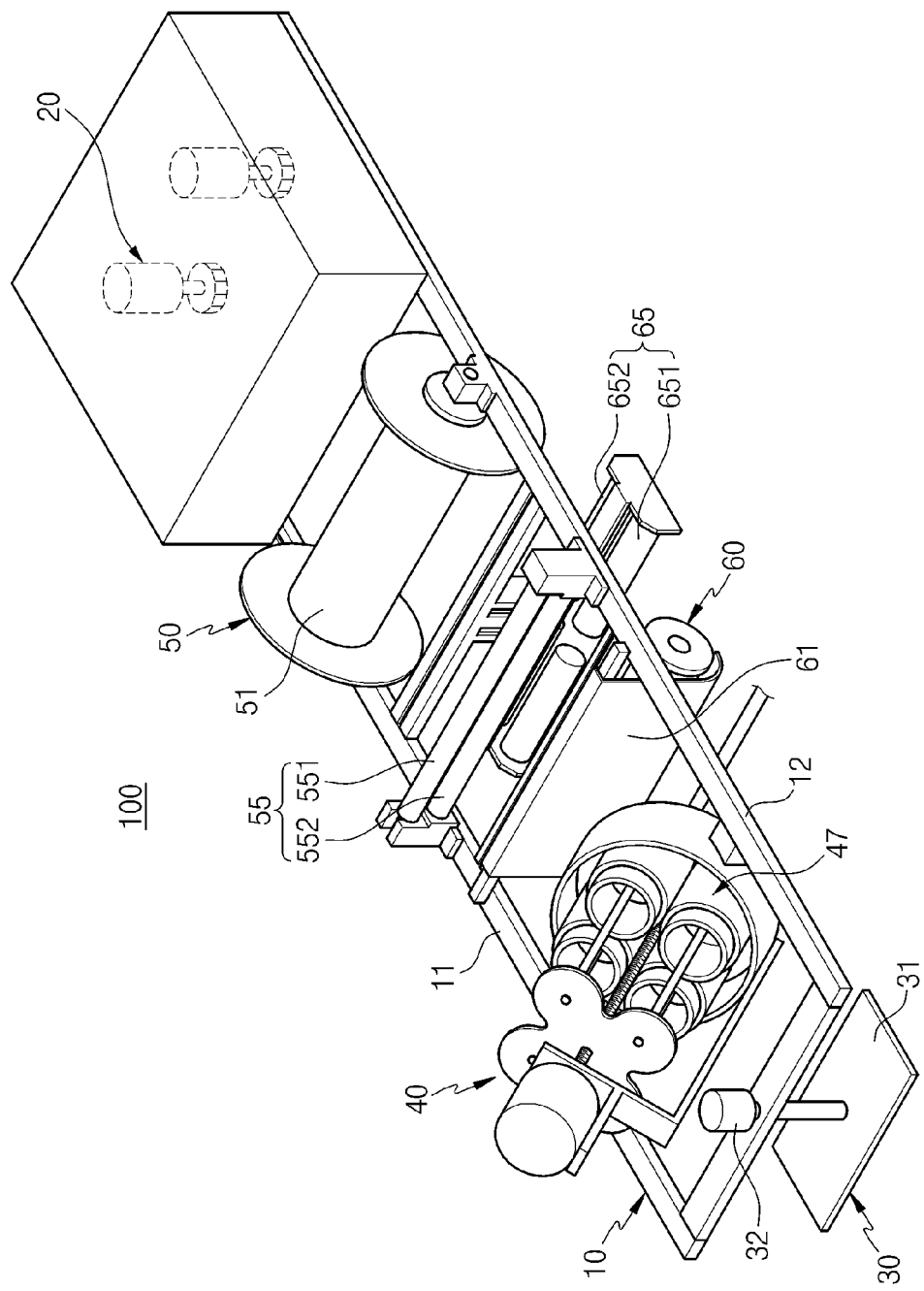
FIG. 1 is a perspective view of a device for bonding an auxiliary secondary barrier for a liquefied natural gas (LNG) storage tank according to an embodiment of the present invention.

FIG. 1 is a perspective view of a device for bonding an auxiliary secondary barrier for a liquefied natural gas (LNG) storage tank (hereinafter, referred to as a "bonding device") according to an embodiment of the present invention.

Referring to FIG. 1, a bonding device 100 according to the current embodiment includes a frame 10, a driving unit 20, a heater 30, an adhesive applying unit 40, and an auxiliary secondary barrier supply unit 50. All of a portion of the driving unit 20, the heater 30, the adhesive applying unit 40, and the auxiliary secondary barrier supply unit 50 are mounted on the frame 10.

The frame 10 includes first and second frames 11 and 12 that are disposed in parallel with each other. The frame 10 travels to correspond to an exposed portion of a main secondary barrier on an upper heat insulation board by the driving unit 20. The heater 30 heats the exposed portion of the main secondary barrier to be applied with an adhesive, and the adhesive applying unit 40 applies the adhesive to the exposed portion of the heated main secondary barrier. The auxiliary secondary barrier supply unit 50 supplies an auxiliary secondary barrier on the adhesive to bond the auxiliary secondary barrier to the main secondary barrier. Here, the adhesive applying unit 40 may include a heating part 47 for heating the embedded adhesive.

Figure 2:
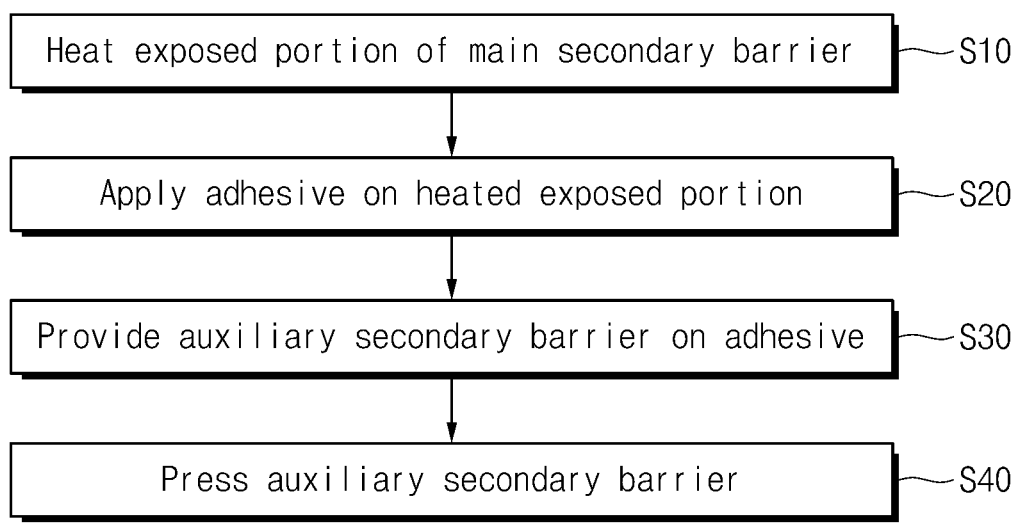
FIG. 2 is a flowchart of a method for bonding the auxiliary secondary barrier for the LNG storage tank according to an embodiment of the present invention.

FIG. 2 is a flowchart of a method for bonding the auxiliary secondary barrier for the LNG storage tank (hereinafter, referred to as a "bonding method") according to an embodiment of the present invention. The bonding method according to the current embodiment includes following processes to bond the auxiliary secondary barrier to the main secondary barrier by using the bonding device 100 of FIG. 1.

Referring to FIG. 2, a bonding method according to the current embodiment includes a first process (S10) of heating an exposure portion of a main secondary barrier to be applied with an adhesive to provide heat for curing the adhesive, a second process (S20) for applying the adhesive on the heated exposure portion, a third process (S30) for providing an auxiliary secondary barrier on the adhesive, and a fourth process (S40) of pressing the auxiliary secondary barrier to attach the auxiliary secondary barrier to the exposure portion.

In the second process (S20), the adhesive may be applied in a state where the adhesive is heated by a heating part 47 mounted on the adhesive applying unit 40.

Figure 3:
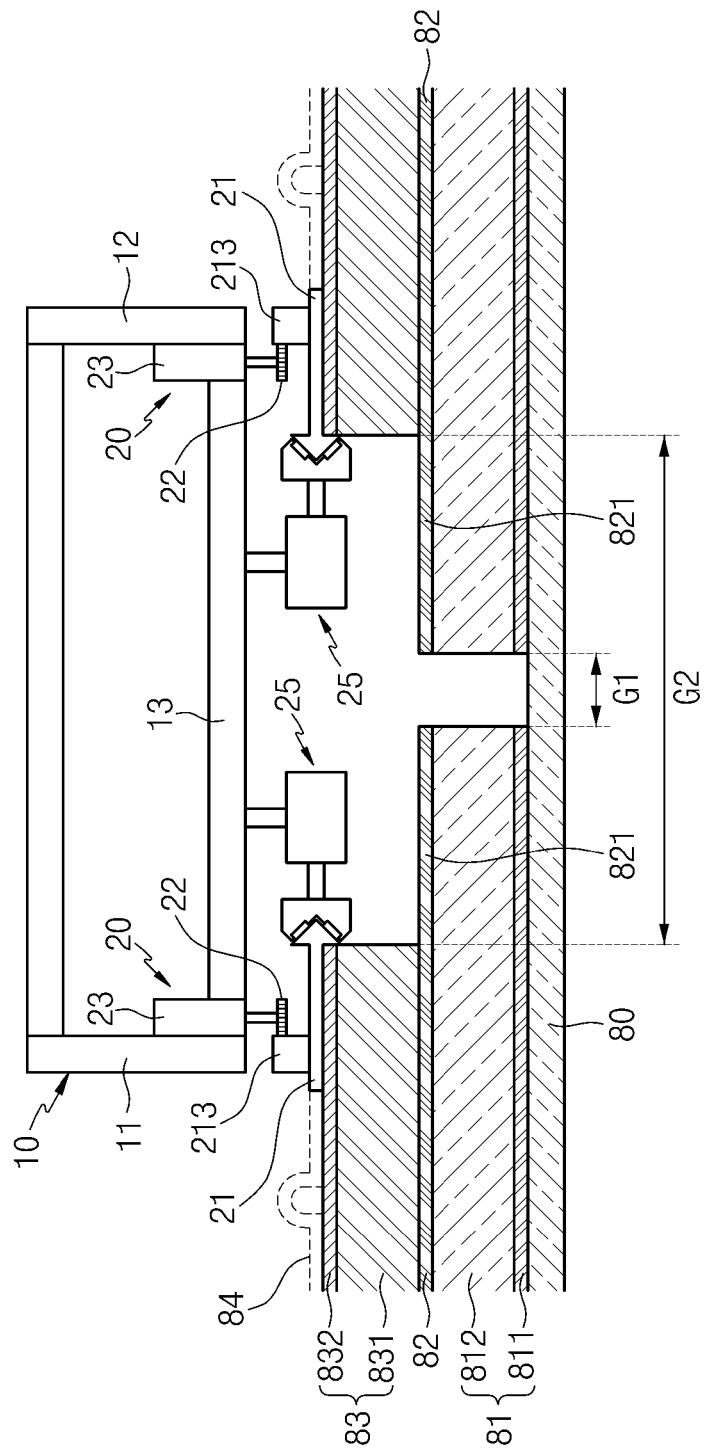
FIG. 3 is a partial cross-sectional view illustrating the LNG storage tank and a driving unit of the device for bonding the auxiliary secondary barrier of FIG. 1.
Figure 4:
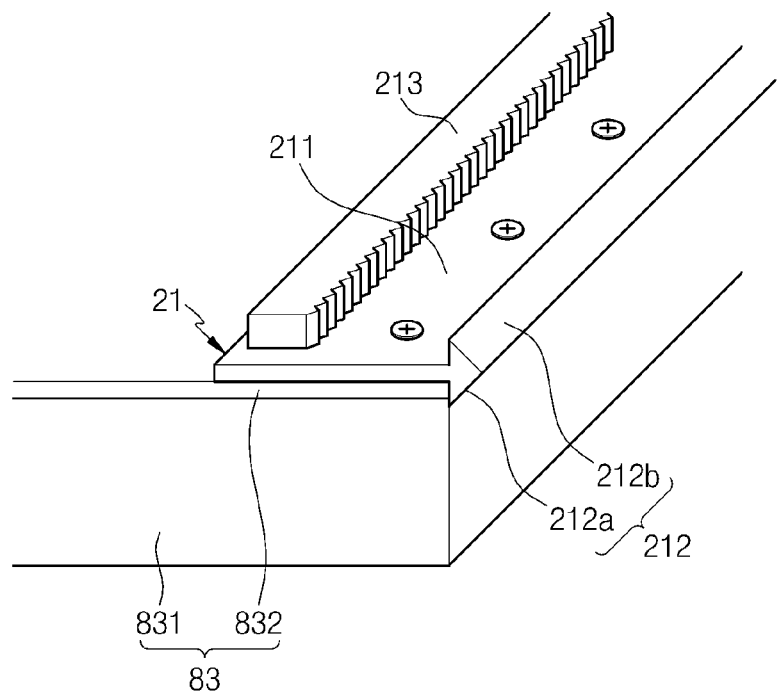
FIG. 4 is a partial cutoff perspective view illustrating an upper heat insulation board and a guide rail of FIG. 3.

FIG. 3 is a partial cross-sectional view illustrating the LNG storage tank and the driving unit of the device for bonding the auxiliary secondary barrier of FIG. 1, and FIG. 4 is a partial cutoff perspective view illustrating the upper heat insulation board and the guide rail of FIG. 3. A structure of the LNG storage tank and the driving unit of the bonding device will be described.

Referring to FIGS. 3 and 4, the LNG storage tank includes a lower heat insulation board 81, a main secondary barrier 82, an upper heat insulation board 83, and a primary barrier 84, which are successively stacked within an inner hull 80.

The lower heat insulation board 81 may be a heat insulation board disposed between the main secondary barrier 82 and the inner hull 80. The lower heat insulation board 81 is constituted by a lower heat insulation member protection plate 811 fixed to the inner hull 80 by a fixing member (not shown) and a lower heat insulation member 812 attached to the lower heat insulation member protection plate 811.

The upper heat insulation board 83 may be a heat insulation board disposed between the primary barrier 84 and the main secondary barrier 82. The upper heat insulation board 83 is constituted by an upper heat insulation member 831 attached to the main secondary barrier 82 and an upper heat insulation member protection plate 832 attached to the upper heat insulation member 831.

Each of the upper and lower heat insulation members 831 and 812 may be formed of an excellent insulation material, for example, polyurethane foam to give an insulation property between the inner hull 80 and the LNG. Each of the upper and lower heat insulation member protection plates 832 and 811 may be formed of plywood to give mechanical rigidity to the upper and lower heat insulation boards 81 and 83.

Each of the main secondary barrier 82 and the auxiliary secondary barrier (not shown) may be formed of a metal composite laminate on which a metal foil is attached to each of both surfaces of a glass-fiber composite. The primary barrier 84 may be formed of a metal material having low-temperature brittleness resistance such as an aluminum ally, an invar, 9% nickel steel, a stainless steel sheet, and the like. Although the primary barrier 84 is not installed in the process of bonding the auxiliary secondary barrier, the primary barrier 84 is illustrated by dotted line so as to explain the structure of the LNG storage tank.

The lower heat insulation board 81 has a preset area and is divided into two parts which are disposed spaced a predetermined distance from each other in the inner hull 80. A first gap G1 of the lower heat insulation board 81 is set within a range enough to absorb contraction and expansion of the lower heat insulation board 81. The main secondary barrier 82 is attached to a top surface of the lower heat insulation board 81. Also, the main secondary barrier 82 and the auxiliary secondary barrier (not shown) constitute the secondary barrier. Also, the main secondary barriers is divided into two parts which are parallelly disposed with the first gap G1 therebetween.

The upper heat insulation board 83 has an area less than that of each of the lower heat insulation board 81 and the main secondary barrier 82. The upper heat insulation board 83 is divided into two parts which are disposed spaced a predetermined distance from each other on the main secondary barrier 82. A second gap G2 of the upper heat insulation board 83 is greater than the first gap G1 of the lower heat insulation board 81. Thus, the main secondary barrier 82 has a surface (hereinafter, referred to as an "exposed portion 821") exposed to the outside along an edge of the upper heat insulation board 83.

The driving unit 20 of the bonding device 100 is mounted on the frame 10, and the frame 10 travels to correspond to the exposed portion 821 of the main secondary barrier 82 on the upper heat insulation board 83. For the traveling of the frame 10, the driving unit 20 includes a guide rail 21 disposed on an edge of a top surface of the upper heat insulation member protection plate 832. The guide rail 21 is provided in a pair on left and right sides of the exposed portion 821 of the main secondary barrier.

The guide rail 21 has an approximately arrow-shaped sectional shape. For example, the guide rail 21 includes a flat part 221 disposed on the top surface of the upper heat insulation member protection plate 832, an inclination part 212 connected to an edge of the flat part 211 and exposed to a space between the upper heat insulation boards 83, and a rack gear 213 fixed to the flat part 211.

The flat part 211 is fixed to the top surface of the upper heat insulation member protection plate 832 by a fixing unit such as a bolt. The rack gear 213 has a gear surface on one surface facing the inclination part 212 and is engaged with a pinion gear 22 of the driving unit 20 to guide a traveling path of the frame 10.

The inclination part 212 has a first inclination surface 212a disposed to face the exposed portion 821 and a second inclination surface 212b disposed away from the exposed portion 821. Each of the first inclination surface 212a and the second inclination surface 212b may be inclined at an angle of approximately 45° with respect to a direction parallel to the exposed portion 821. The inclination part 212 is engaged with an adhesion part 25 of the driving unit 20 so that the bonding device 100 travels in a state where the bonding device 100 is firmly closely attached to the upper heat insulation board 83.

The driving unit 20 of the bonding device 100 includes a motor 23, the pinion gear 22, and the adhesion part 25. The motor 23, the pinion gear 22, and the adhesion part 25 are disposed on each of the first and second frames 11 and 12. The pinion gear 22 is engaged with the rack gear 213. Also, the pinion gear 22 rotates by power of the motor 23 to allow the frame 10 to travel along a longitudinal direction of the rack gear 213, i.e., a longitudinal direction of the guide rail 21.

Figure 5:
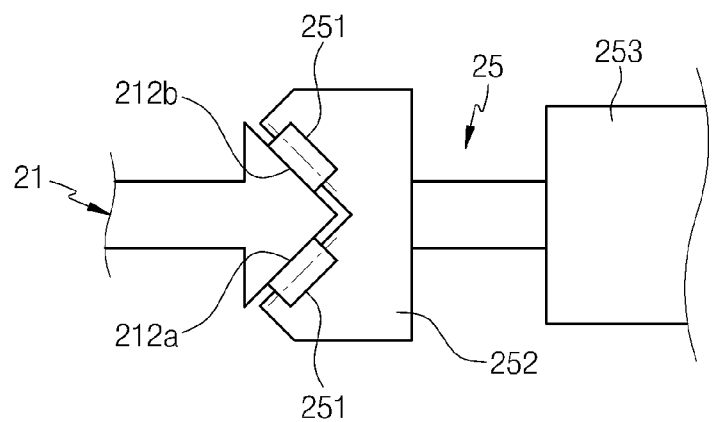
FIG. 5 is an enlarged view illustrating the guide rail and an adhesion part of FIG. 3.

FIG. 5 is an enlarged view illustrating the guide rail and the adhesion part of FIG. 3.

Referring to FIGS. 3 to 5, the adhesion part 25 includes a pair of guide wheels 251 rolled while being in contact with the first and second inclination surfaces 212a and 212b, a support part 252 supporting the guide wheels 251 to allow the guide wheels to rotate, and a first press part 253 connected to the support part 252 to press the support part 252 toward the guide rail 21.

The first press part 253 may be a hydraulic cylinder. The first press part 253 is fixed to a third frame 13 disposed between the first and second frames 11 and 12.

In the bonding device 100 according to the current embodiment, since the driving unit 20 operates by simple structures such as the motor 23 and the pinion 22, the bonding device may be easily manufactured. Also, since the driving unit 20 includes the adhesion part 25, the bonding device 100 may move in the state where the bonding device 100 is firmly closely attached to the upper heat insulation board 83. Thus, the bonding device 100 may be firmly closely attached to the upper heat insulation board 83 without being separated from the upper heat insulation board 83 even though the bonding device 100 is disposed on a portion corresponding to an inner wall or ceiling of the LNG storage tank.

That is, the bonding device 100 travels on the upper heat insulation board 83 corresponding to the inner wall of the LNG storage tank in a state where the bonding device 100 is inclined at an angle of approximately 90°. Also, the bonding device 100 travels on the upper heat insulation board 83 corresponding to the ceiling in a state where the bonding device 100 is turned inside out at an angle of 180°. In this state, the bonding device 100 may easily travel in the sate where the bonding device 100 is firmly closely attached to the upper heat insulation board 83 by the constitutions such as the inclination part 212 and the adhesion part 25 of the guide rail 21.

Figure 6:
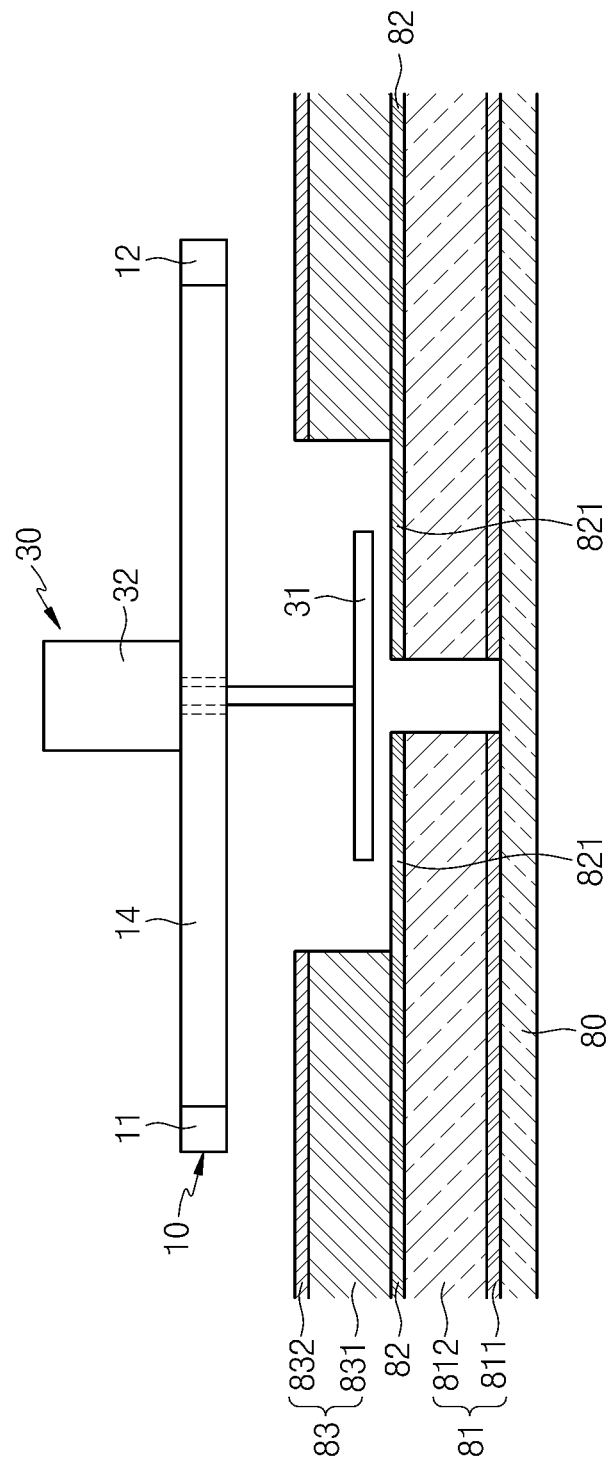
FIG. 6 is a partial cross-sectional view illustrating the LNG storage tank and a heater of the device for bonding the auxiliary secondary barrier of FIG. 1.

Next, the heater 30 of the bonding device 100 will be described. FIG. 6 is a partial cross-sectional view illustrating the LNG storage tank and the heater of the bonding device of FIG. 1.

Referring to FIGS. 1 to 6, the heater 30 is disposed on the foremost position of the frame 10 along the traveling direction of the bonding device 100. Also, the adhesive applying unit 40 for applying the adhesive to the exposed portion 821 of the main secondary barrier 82 is disposed on a next position following the heater 30.

The heater 30 heats the exposed portion 821 of the main secondary barrier 82 to be applied with the adhesive, and the adhesive applying unit 40 applies the adhesive on the heated main secondary barrier 82. Thus, the heater 30 provides sufficient heat required for curing the adhesive before the auxiliary secondary barrier is provided on the adhesive to improve bonding quality of the auxiliary secondary barrier.

The heater 30 does not contact the exposed portion 821 of the main secondary barrier 82 to prevent the main secondary barrier 82 from being damaged. Also, the heater 30 heats the exposed portion 821 of the main secondary barrier 82 by using at least one of conduction, convection, and radiant heat.

For example, the heater 30 may include a heating plate 31 and a second press part 32 for adjusting a height of the heating plate 31. The heating plate 31 and the second press part 32 is fixed to a fourth frame 14 disposed between the first and second frames 11 and 12. The heating plate 31 is disposed spaced a predetermined distance upward from the exposed portion 821 of the main secondary barrier 82 to provide heat to the exposed portion 821 of the main secondary barrier 82.

Although one heating plate 31 is provided in FIG. 6, the number of heating plate 31 is not limited thereto. For example, two heating plates may be provided by a predetermined distance to correspond to the gap of the main secondary barrier 82. Alternatively, a plurality of heating plates may be disposed along the traveling direction of the bonding device 100.

The bonding device 100 according to the current embodiment does not include a heating skate plate for directly heating the auxiliary secondary barrier because the above-described heater 30 is provided.

Figure 7:
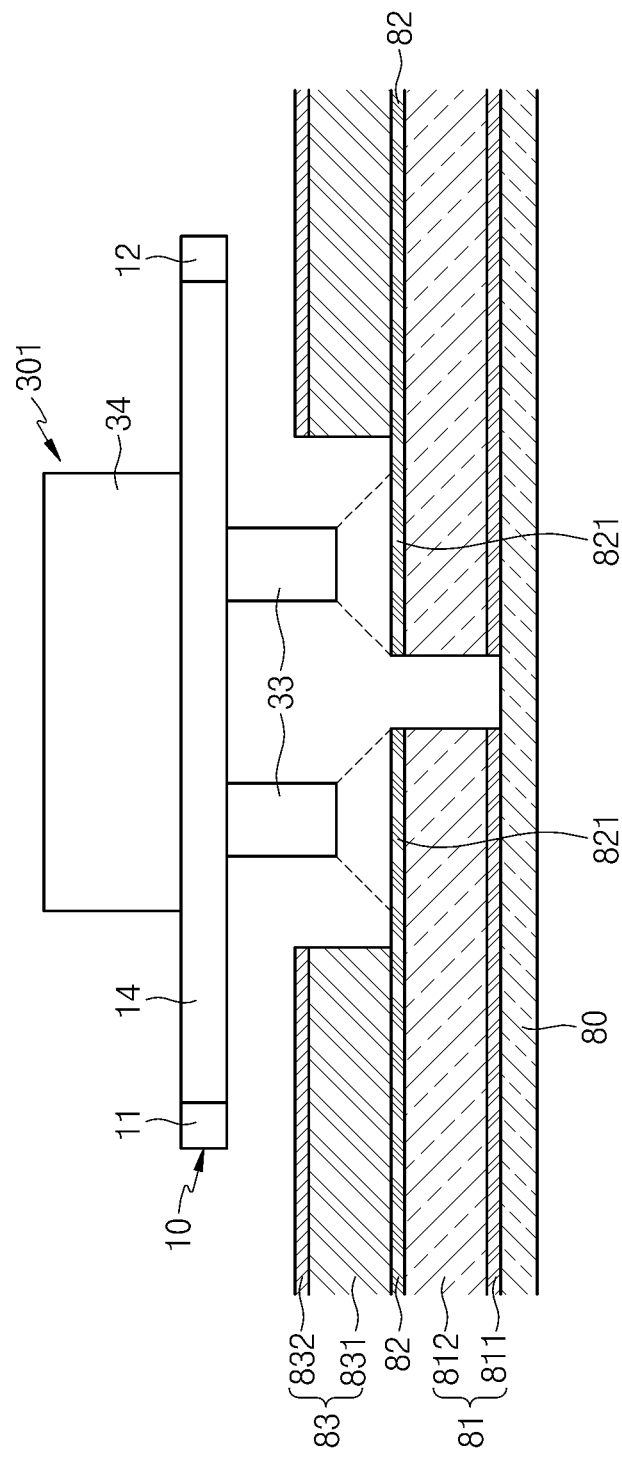
FIG. 7 is a partial cross-sectional view illustrating the LNG storage tank and a heater so as to explain a modified example of the heater of FIG. 6.

FIG. 7 is a partial cross-sectional view illustrating the LNG storage tank and a heater so as to explain a modified example of the heater of FIG. 6.

Referring to FIG. 7, a heater 301 may include a hot air nozzle 33 for discharging hot air and a blower 34 including a heating part. The hot air nozzle 33 may be provided in plurality. The hot air nozzle 33 receives the hot air from the blower 34 to discharge the hot air to the exposed part 821 of the main secondary barrier 82. The hot air nozzle 33 is disposed spaced a predetermined distance upward from the exposed portion of the main secondary barrier 82.

Although the heaters 30 and 301 each including the heating plate 31 and the hot air nozzle 33 are described as an example in FIGS. 6 and 7, a heater is not limited to the foregoing examples. That is, all heaters that can heat the exposed portion 821 of the main secondary barrier 82 by using at least one of conduction, convection, and radiant heat may be applicable.

Next, the adhesive applying unit 40 of the bonding device 100 will be described.

Figure 8:
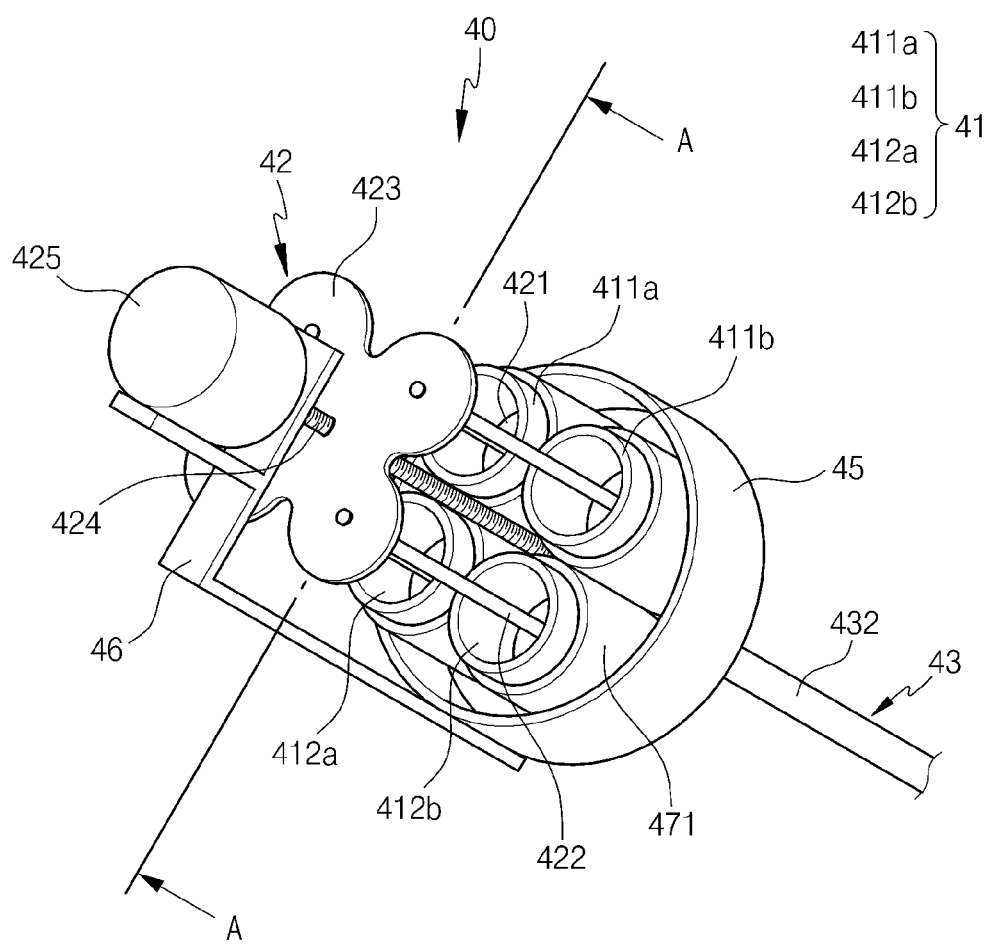
FIG. 8 is a partial perspective view of an adhesive applying unit of the device for bonding the auxiliary secondary barrier of FIG. 1.
Figure 9:
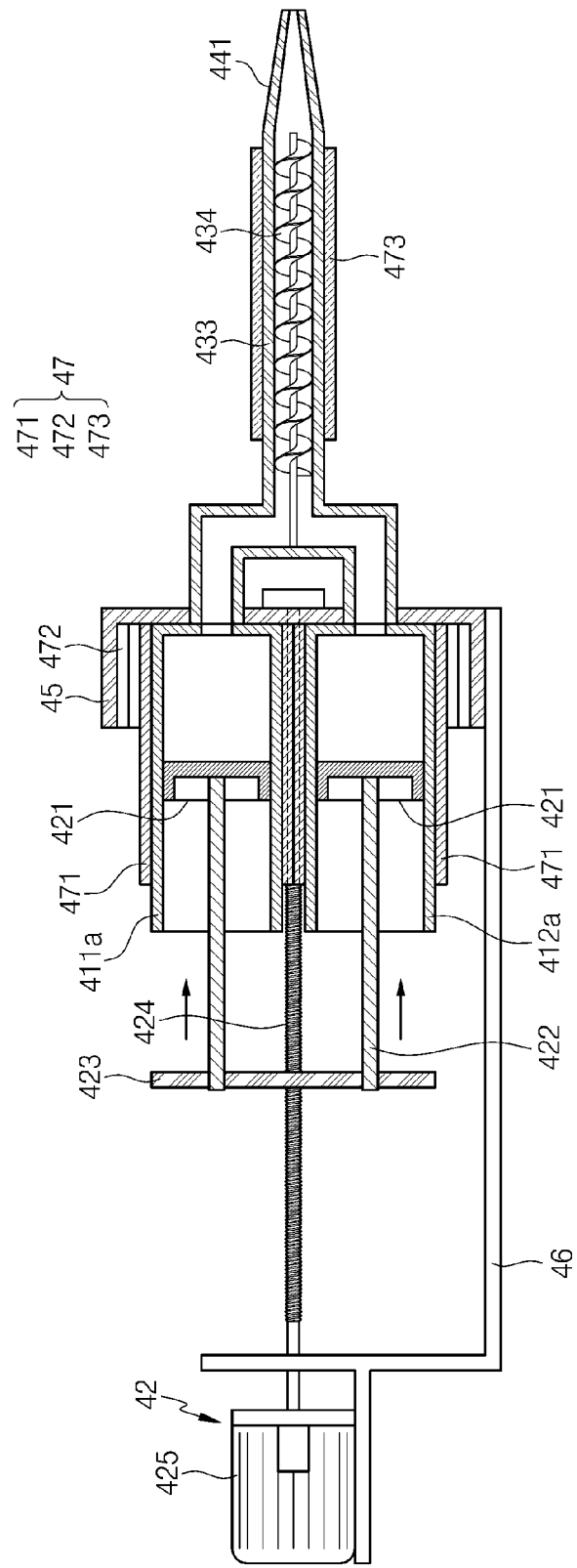
FIG. 9 is a cross-sectional view of the adhesive applying unit, taken along line A-A of FIG. 8.
Figure 10:
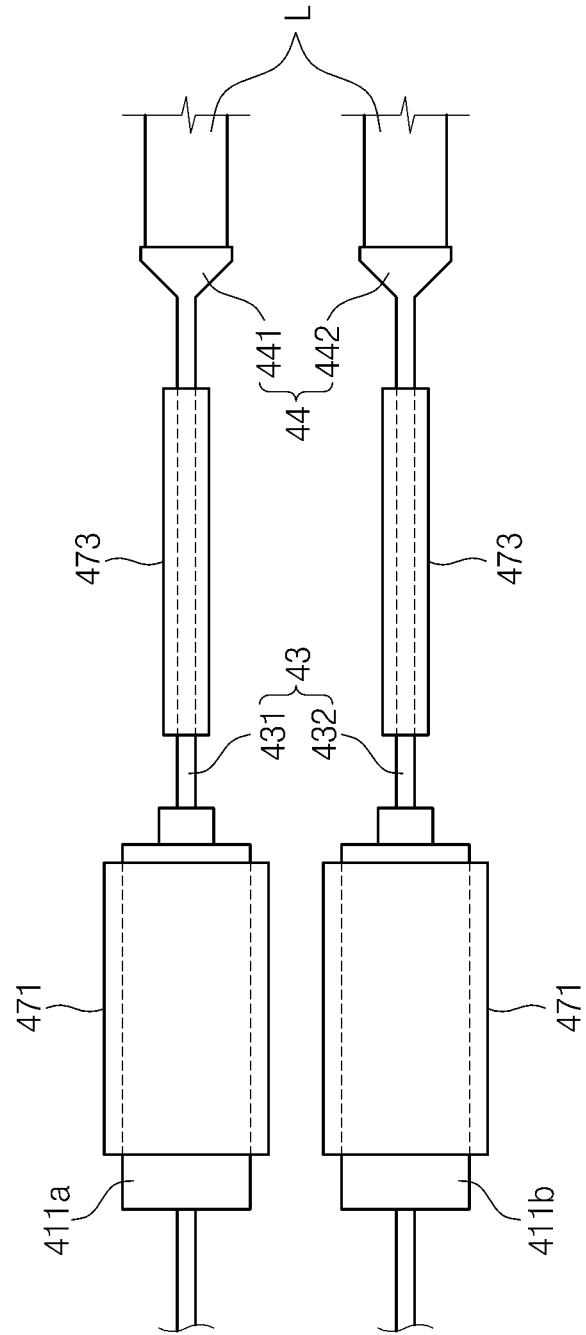
FIG. 10 is a schematic plan view illustrating a portion of the adhesive applying unit of FIG. 1.
Figure 11:
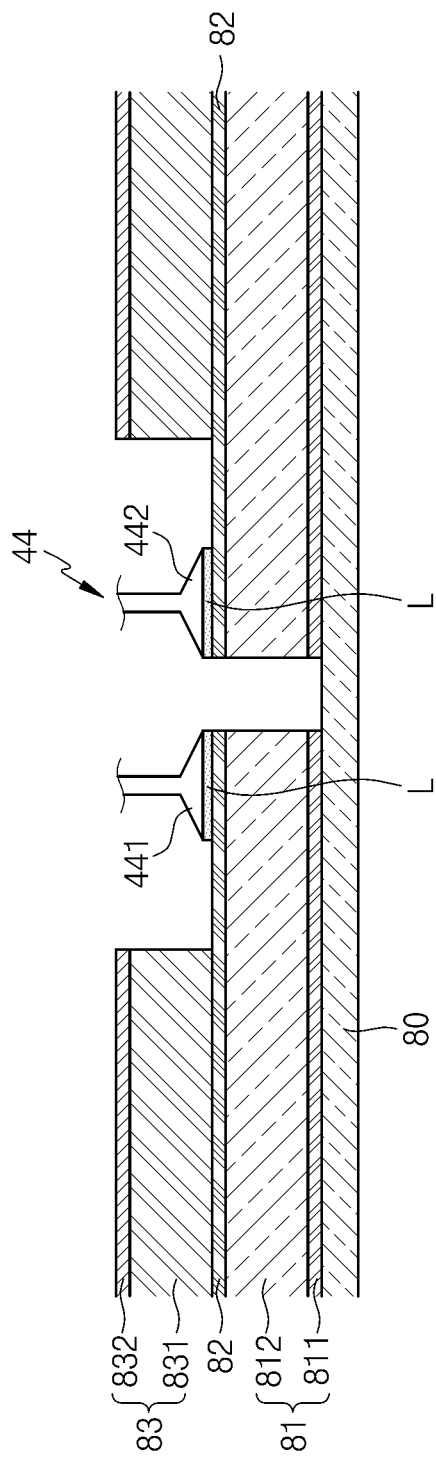
FIG. 11 is a partial cross-sectional view illustrating portions of the LNG storage tank and the adhesive applying unit of the device for bonding the auxiliary secondary barrier of FIG. 1.

FIG. 8 is a partial perspective view of the adhesive applying unit of the bonding device of FIG. 1, and FIG. 9 is a cross-sectional view of the adhesive applying unit, taken along line A-A of FIG. 8. FIG. 10 is a schematic plan view illustrating a portion of the adhesive applying unit of FIG. 1, and FIG. 11 is a partial cross-sectional view illustrating portions of the LNG storage tank and the adhesive applying unit of the bonding device of FIG. 1.

Referring to FIGS. 1 and 8 to 11, the adhesive applying unit 40 includes a cartridge 41, a press part 42, a mixing part 43, a nozzle part 44, and a heating part 47.

The cartridge 41 includes main material cartridges 411a and 411b containing a main material and curing agent cartridges 412a and 412b containing a curing agent. The press part 42 presses the cartridge 41 to discharge the main material and curing agent that are contained in the cartridge 41 to the outside of the cartridge 41. The mixing part 43 receives the main material and the curing agent to mix the main material with the curing agent. The nozzle part 44 discharges the mixed two-component adhesive L to the exposed portion 821 of the main secondary barrier 82.

The main material cartridges 411a and 411b, the curing agent cartridges 412a and 412b, the mixing part 43, and the nozzle part 44 may be provided in a pair. Thus, the adhesive applying unit 40 may apply the adhesive L by performing an applying process on both exposed portions 821 facing each other with the first gap G1 therebetween one time.

For example, the main material cartridges 411a and 411b includes a first main material cartridge 411a and a second main material cartridge 411b, and the curing agent cartridges 412a and 412b includes a first curing agent cartridge 412a and a second curing agent cartridge 412b.

The first main material cartridge 411a and the first curing agent cartridge 412a contain the main material and curing agent to be applied to the exposed portion 821 of the main secondary barrier 82 that is disposed at one side, respectively. The second main material cartridge 411b and the second curing agent cartridge 412b contain the main material and curing agent to be applied to the exposed portion 821 of the main secondary barrier 82 that is disposed at the other side, respectively.

Alternatively, the main material cartridges 411a and 411b and the curing agent cartridges 412a and 412b may be integrally provided to supply the main material and the curing agent to the exposed portion 821 of the main secondary barrier 821 at the same time (not shown). In the two cases, the cartridge 41 is fixedly mounted to the inside of a cartridge accommodation part 45.

The press part 42 includes a piston 421, a rod 422, a moving member 423, a lead screw 424, and a driving motor 425. The piston 421 and the rod 422 are inserted into one side of the cartridge 41 to press the inside of the cartridge 41. Each of the piston 421 and the rod 422 is provided in plurality. That is, each of the piston 421 and the rod 422 may be disposed on each of the first and second main material cartridges 411a and 411b and the first and second curing agent cartridges 412a and 412b.

The moving member 423 is integrally connected to the plurality of rods 422 to equally operate the plurality of pistons 421. The lead screw 424 is screw-coupled to the moving member 423 and has one end rotatably mounted on the cartridge accommodation part 45. When the lead screw 424 rotates at one position of the cartridge accommodation part 45, the moving member 423 linearly moves on the lead screw 424 to press the plurality of pistons 421 at the same time.

The driving motor 425 is connected to the lead screw 424 to provide rotational force to the lead screw 424. The driving motor 425 may be fixed to the cartridge accommodation part 45 by a bracket 46. The driving motor 425 and the lead screw 424 may be replaced with a hydraulic cylinder (not shown) connected to the moving member 423.

The mixing part 43 is configured to mix the main material and the curing agent which are respectively supplied from the main material cartridges 411a and 411b and the curing agent cartridges 412a and 412b to transfer the mixture to the nozzle part 44. The mixing part 43 may be provided as a static mixer which connects outlets of the main material cartridges 411a and 411b and the curing agent cartridges 412a and 412b to the nozzle part 44.

For example, the mixing part 43 includes a first static mixer 431 and a second static mixer 432, and the nozzle part includes first and second nozzles 441 and 442 which are respectively connected to the first and second static mixers 431 and 432.

The first static mixer 431 is connected to the first main material cartridge 411a and the first curing agent cartridge 412a to mix the main material and curing agent which are respectively supplied from the first main material cartridge 411a and the first curing agent cartridge 412a, thereby supplying the mixture to the first nozzle 441. The second static mixer 432 is connected to the second main material cartridge 411b and the second curing agent cartridge 412b to mix the main material and curing agent which are respectively supplied from the second main material cartridge 411b and the second curing agent cartridge 412b, thereby supplying the mixture to the second nozzle 442.

Each of the first and second static mixers 431 and 432 includes a screw 434 within a pipe 433 to mix the main material with the curing agent while forcibly transferring the main material and the curing agent between the pipe 433 and the screw 434.

The first and second nozzles 441 and 442 are disposed in a state where each of the first and second nozzles 441 and 442 are inclined with respect to the exposed portion 821. Also, each of the first and second nozzles 441 and 442 may have a structure in which a discharge hole of each of the first and second nozzles 441 and 442 is gradually expanded from each of the first and second static mixers 431 and 432. In this case, the adhesive L may be widely applied and easily adjusted in thickness. The above-described cartridge 41, the press part 42, and the mixing part 43 may be substituted for existing heavy-duty dispenser.

The heating part 47 is disposed on at least one of the cartridge 41 and the mixing part 43 to heat the adhesive L. That is, the heating part 47 may separately heat the main material and the curing agent or may heat the mixture of the main material and the curing agent.

For example, the heating part 47 may include at least one of a first heating part 471, a second heating part 472, and a third heating part 473. For convenience, in the current embodiment, the heating part 47 includes the first to third heating parts 471, 472, and 473.

The first heating part 471 is mounted on an outer surface of each of the cartridges 41 to heat the main material and curing agent for each cartridge 41. The second heating part 472 is mounted inside the cartridge accommodation part 45 accommodating the cartridge 41 to heat the main material and curing agent within the cartridge in a lump. The third heating part 473 is mounted outside the first and second static mixers 431 and 432 constituting the mixing part 43 to heat the main material and curing agent, which are being mixed with each other, or the mixture of the main material and the curing agent.

The first to third heating parts may be independently controlled. Alternatively, one or two of the first to third heating parts 471, 472, and 473 may be selectively operated, or all of the first to third heating parts 471, 472, and 473 may be operated. The operation conditions may be variously set according to a heating degree required for the main material and curing agent.

When the first and second heating parts 471 and 472 are operated to heat the main material and curing agent, the main material and curing agent may be heated at a temperature less than a phase separation temperature thereof. When the third heating part 473 is operated to heat the mixture of the main material and the curing agent, the mixture of the main material and the curing agent may be heated at a temperature greater than a curing temperature of the adhesive.

Thus, since the main secondary barrier 82 is heated by using the heater 30, and the adhesive L is heated by using the heating part 47, the adhesive L may secure sufficient heat before the adhesive L contacts the auxiliary secondary barrier.

Figure 12:
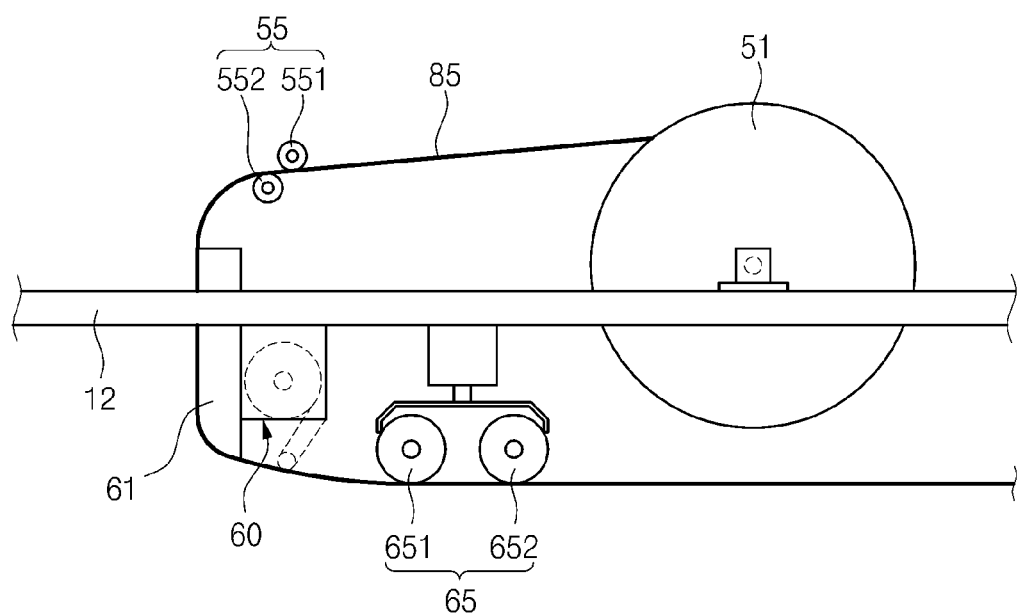
FIG. 12 is a partial side view of the device for bonding the auxiliary secondary barrier of FIG. 1.
Figure 13:
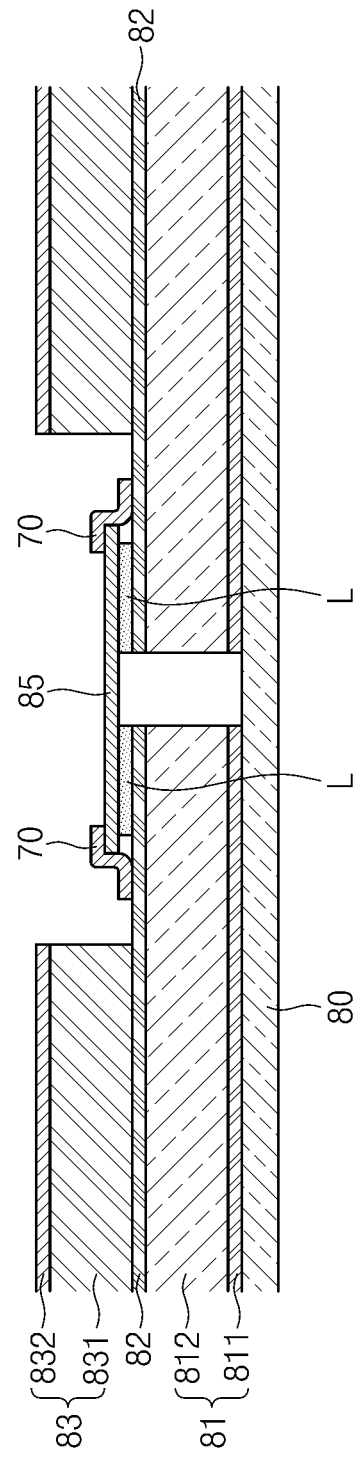
FIG. 13 is a partial cross-sectional view of the LNG storage tank in a state where the auxiliary secondary barrier and a protection sheet are provided on an exposed portion of a main secondary barrier to which the adhesive is applied.

FIG. 12 is a partial side view of the bonding device of FIG. 1, and FIG. 13 is a partial cross-sectional view of the LNG storage tank in a state where the auxiliary secondary barrier and the protection sheet are provided on the exposed portion of the main secondary barrier to which the adhesive is applied.

Referring to FIGS. 1, 12, and 13, the bonding device 100 includes an auxiliary secondary barrier supply unit 50 disposed on the frame 10, a tension adjustment unit 55, a protection sheet cartridge 60, and a press roller unit 65.

The auxiliary secondary barrier supply unit 50 includes a central shaft member 51 that winds the auxiliary secondary barrier 85 in a roll shape. The central shaft member 51 is disposed on the frame 10 by a barring to rotate, thereby successively unwinding the auxiliary secondary barrier 85.

The tension adjustment unit 55 includes a first tension roller 551 and a second tension roller 552 which are adjustable in distance therebetween. The auxiliary secondary barrier 85 unwound from the central shaft member 51 is provided between the first and second tension rollers 551 and 552. The tension adjustment unit 55 may temporarily restrain and guide the auxiliary secondary barrier 85 and also apply tension to the auxiliary secondary barrier 85 so that the auxiliary secondary barrier is strainedly unwound and supplied.

The protection sheet cartridge 60 includes a roll holder (not shown) that winds the protection sheet 70 in a roll shape. As the roll holder rotates, the protection sheet 70 is successively wound. The protection sheet 70 may cover an edge and the outside of the auxiliary secondary barrier 85 to trap the adhesive L when the adhesive L pressed by a pressure is spread laterally.

A guide plate member 61 having a rotatably openable structure is disposed on a front side of the protection sheet cartridge 60. The auxiliary secondary barrier 85 passing through the first and second tension rollers 551 and 552 is wound and turned around the guide plate member 61 and then provided to the press roller unit 65.

The press roller unit 65 includes a front roller 651 and a rear roller 652 which are provided in a pair on left and right sides and disposed on front and rear sides with a stepped portion therebetween. The auxiliary secondary battier 85 that is wound around the guide plate member 61 and then returned again is pressed by the front and rear rollers 651 and 652. The press roller unit 65 may apply a pressure to the auxiliary secondary barrier 85 and the adhesive L to firmly bond the auxiliary secondary barrier 85 to the exposed portion 821 of the main secondary barrier 82 to which the adhesive L is applied. A guide roller unit (not shown) including at least one roller instead of the guide plate member 61 according to an embodiment of the present invention may be provided. Also, the press roller unit 85 may be provided in at least one in a longitudinal direction of the auxiliary secondary barrier 85, but the present invention is not limited to the number of press roller unit 65.

An operation method of the above-described bonding device 100 will be schematically described below.

First, the auxiliary secondary barrier supply unit 50 and the protection sheet cartridge 60 are separated from the bonding device 100. Then, the auxiliary secondary barrier 85 is unwound and spread to move onto the exposed portion 821 of the main secondary barrier 82, to which the adhesive is not applied yet, by using a first jig (not shown). Thereafter, the protection sheet 70 is unwound and spread to move onto an edge of the auxiliary secondary barrier 85 by using a second jig (not shown).

Then, the auxiliary secondary barrier 85 and an end of the protection sheet 70 are fixed in position by using a fixing unit (not shown). Thereafter, the bonding device 100 is disposed on a front side of the fixing unit to mount the auxiliary secondary barrier supply unit 50 and the protection sheet cartridge 60 on the bonding device 100, thereby completing operation preparation.

Then, the members constituting the bonding device 100 start in operation together with the traveling operation of the driving unit 20. Thus, the heater 30 heats the exposed portion 821 of the main secondary barrier 82 while the frame 10 travels, and the adhesive applying unit 40 applies the adhesive L to the heated exposed portion 821 of the main secondary barrier 82. Also, the auxiliary secondary barrier 85 and the protection sheet 70 are provided on the adhesive L, and the press roller unit 65 presses the auxiliary secondary barrier 85 to allow the auxiliary secondary barrier 85 to adhere to the main secondary barrier 82.

According to the bonding device 100 and the bonding method, the exposed portion 821 of the main secondary barrier 82 to be applied with the adhesive L is previously heated by using the heater 30 to provide sufficient heat required for curing the adhesive L. Thus, the adhesive L discharged from the adhesive applying unit 40 receives the heat from the main secondary barrier 82 after the adhesive L is discharged and then is heated at a temperature greater than a curing temperature thereof. Also, the adhesive L may be applied in the state where the adhesive L is heated by using the heating part mounted on the adhesive applying unit 40.

When the auxiliary secondary barrier 85 is provided on the adhesive L, the auxiliary secondary barrier 85 may firmly adhere to the main secondary barrier 82 even if only a pressure is applied to the auxiliary secondary barrier 85. Thus, it is unnecessary to provide the heating skate plate or hot pad for heating the auxiliary secondary barrier 85 in the bonding device 100.

Figure 14:
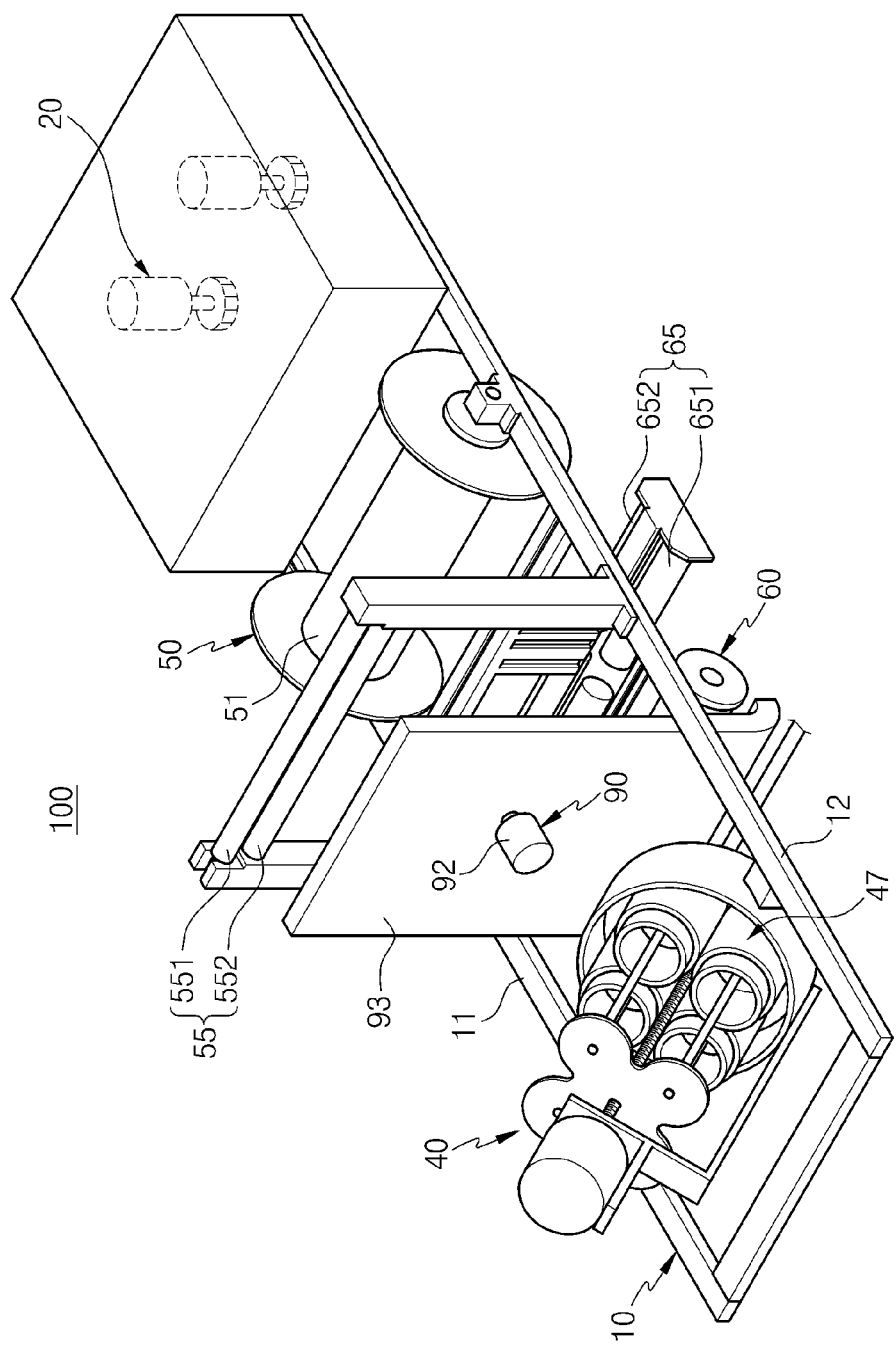
FIG. 14 is a perspective view of a device for bonding an auxiliary secondary barrier for an LNG storage tank according to another embodiment of the present invention.

FIG. 14 is a perspective view of a device for bonding an auxiliary secondary barrier for an LNG storage tank according to another embodiment of the present invention. In description of the embodiment of FIG. 14, duplicated descriptions with respect to the same components as those in the embodiment of FIG. 1 will be omitted.

A bonding device of FIG. 14 includes a heater 90 disposed on a frame 10 to previously heat an auxiliary secondary barrier 85 before an auxiliary secondary barrier 85 is supplied onto an adhesive.

Figure 15:
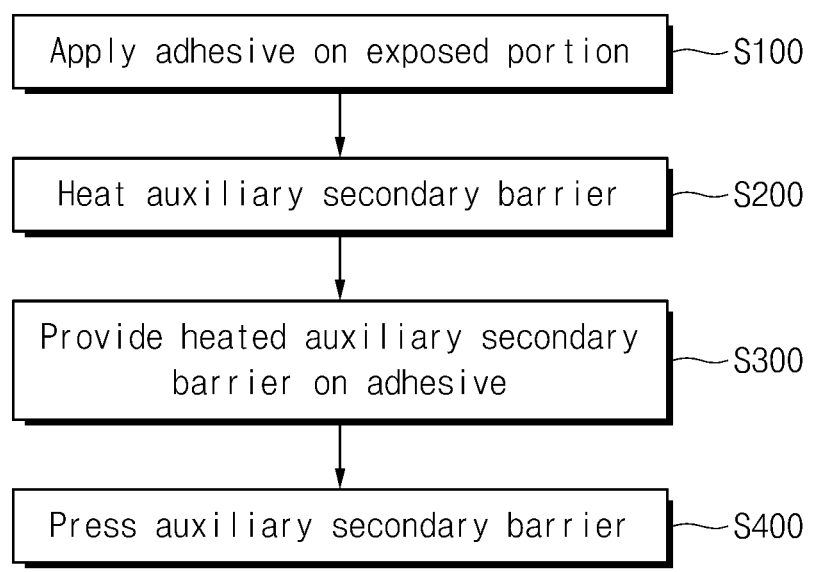
FIG. 15 is a flowchart of a method for bonding the auxiliary secondary barrier for the LNG storage tank according to another embodiment of the present invention.

FIG. 15 is a flowchart of a method for bonding the auxiliary secondary barrier for the LNG storage tank according to another embodiment of the present invention. The bonding method according to the embodiment of FIG. 15 may include following processes to bond the auxiliary secondary barrier to a main secondary barrier by using the bonding device 100 of FIG. 14.

The bonding method according to the embodiment of FIG. 15 includes a process (S100) of applying an adhesive on an exposed portion of the main secondary barrier, a process (S200) of previously heating the auxiliary secondary barrier to be supplied on the applied adhesive, a process (S300) of supplying the heated auxiliary secondary barrier on the adhesive, and a process (S400) of pressing the auxiliary secondary barrier to attach the auxiliary secondary barrier to the exposed portion.

Figure 16:
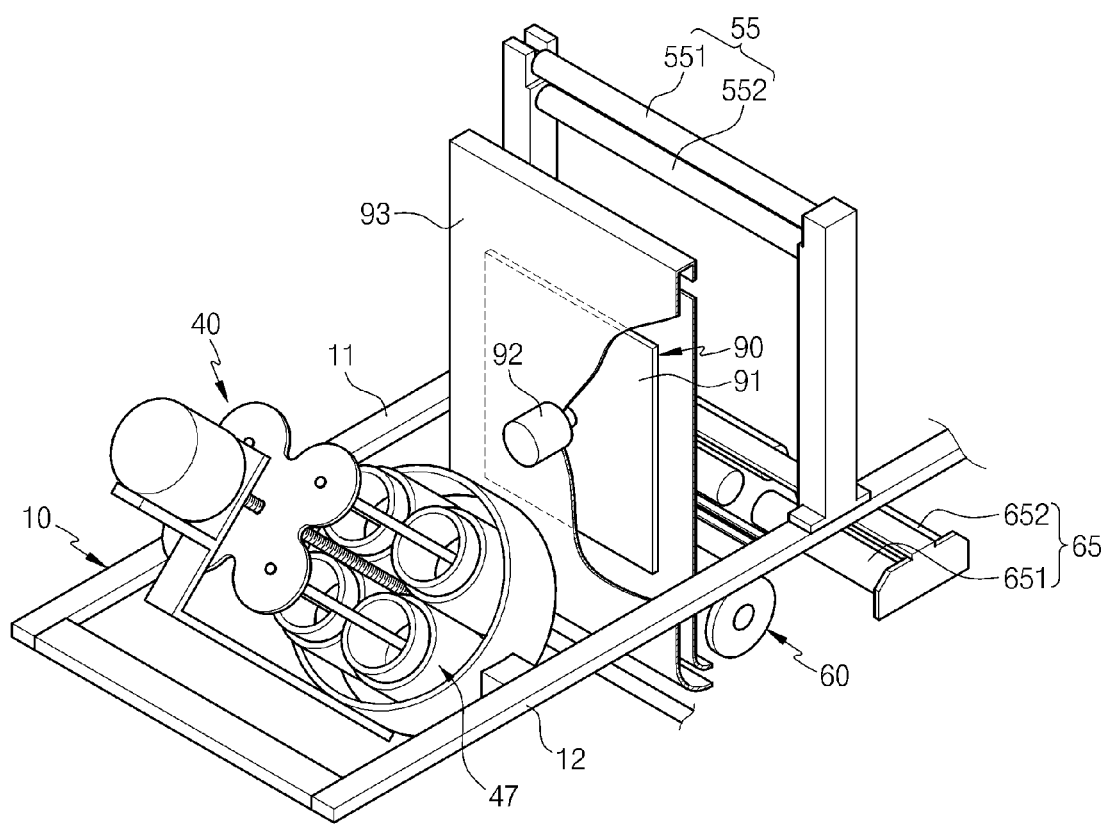
FIG. 16 is a partial cutoff perspective view illustrating a heater of the device for bonding the auxiliary second barrier of FIG. 14.
Figure 17:
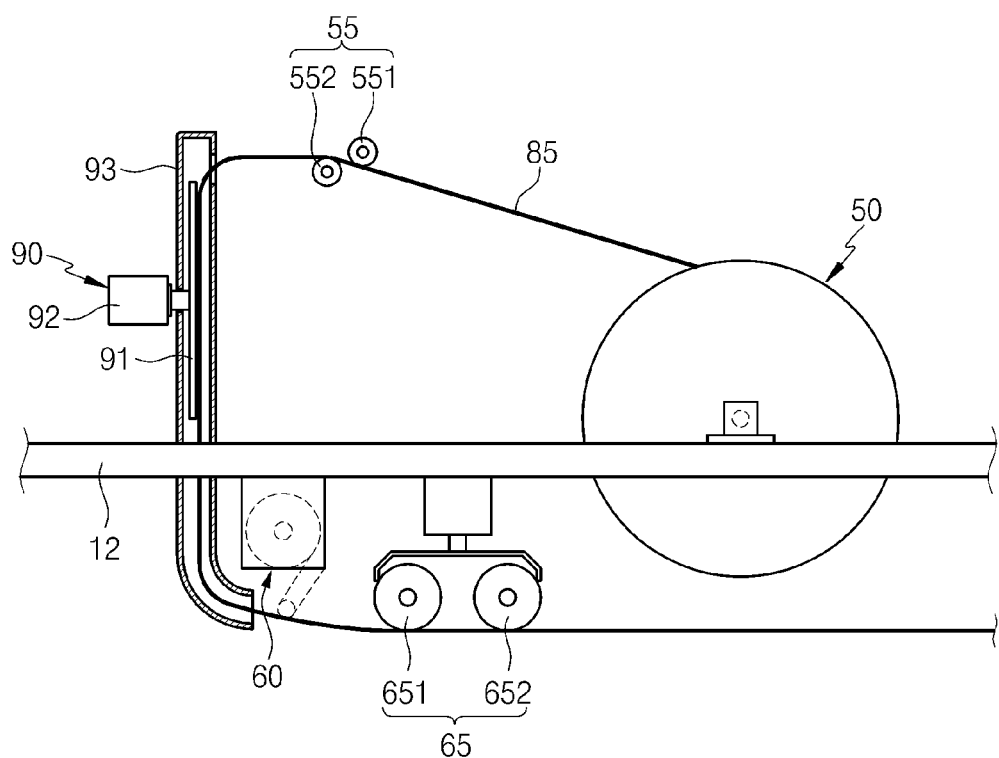
FIG. 17 is a partial side view of the device for bonding the auxiliary secondary barrier of FIG. 14.

FIG. 16 is a partial cutoff perspective view illustrating the heater of the device for bonding the auxiliary second barrier of FIG. 14, and FIG. 17 is a partial side view of the device for bonding the auxiliary secondary barrier of FIG. 14. Referring to FIGS. 14, 16, and 17, the heater 90 is disposed on a front side of the auxiliary barrier supply unit 50 along a traveling direction of the bonding device 100 and is disposed between the adhesive applying unit 40 and the auxiliary secondary barrier supply unit 50 on the frame 10. The heater 90 heats the auxiliary secondary barrier 85 to be supplied onto the applied adhesive. Since the auxiliary secondary barrier 85 heated by the heater 90 is provided on the adhesive disposed on the exposed portion, the auxiliary secondary barrier may be improved in bonding quality.

The heater 90 may contact the auxiliary secondary barrier 85 to supply heat to the auxiliary secondary barrier 85. Alternatively, the heater 90 may supply heat to the auxiliary secondary barrier 85 in a state where the heater 90 does not contact the auxiliary secondary barrier 85. The heater 90 may heat the auxiliary secondary barrier 85 by using at least one of conduction, convection, and radiant heat. For example, the heater 90 may include a body part 93, a heating plate disposed within the body part 93, and a third press part 92 disposed within the body part 93 to adjust a position of the heating plate 91.

The body part 93 is fixed to first and second frames 11 and 12. An inner space of the body part 93 may define a moving path of the auxiliary secondary barrier 85 between the adhesive applying unit 40 and the auxiliary secondary barrier supply unit 50. The auxiliary secondary barrier 85 is discharged toward a discharge part through a discharge hole defined in a bottom surface of the body part 93 via the inner space of the body part 93. The body part 93 may have a lower portion that is bent toward a rear side with respect to the traveling direction of the bonding device 100, and may provide the auxiliary secondary barrier 85 toward a press roller unit 65, like the function of a guide plate member 61 in the bonding device 100 of FIG. 1.

The heating plate 91 may be disposed on a front side of the auxiliary secondary barrier 85 within the inner space of the body part 93 in the moving path of the auxiliary secondary barrier 85 so that the heating plate 91 provides heat to a surface which adheres to the adhesive between both surfaces of the auxiliary secondary barrier 85. In the bonding device of FIG. 14, since the above-described heater 90 directly heats the surface which adheres to the applied adhesive among both surfaces of the auxiliary secondary barrier 85, the adhesive may be more effectively cured when compared to the heating skate plate or hot pad in which heat is indirectly applied to the adhesive through the auxiliary secondary barrier 85 after the auxiliary secondary barrier 85 is provided on the adhesive.

Figure 18:
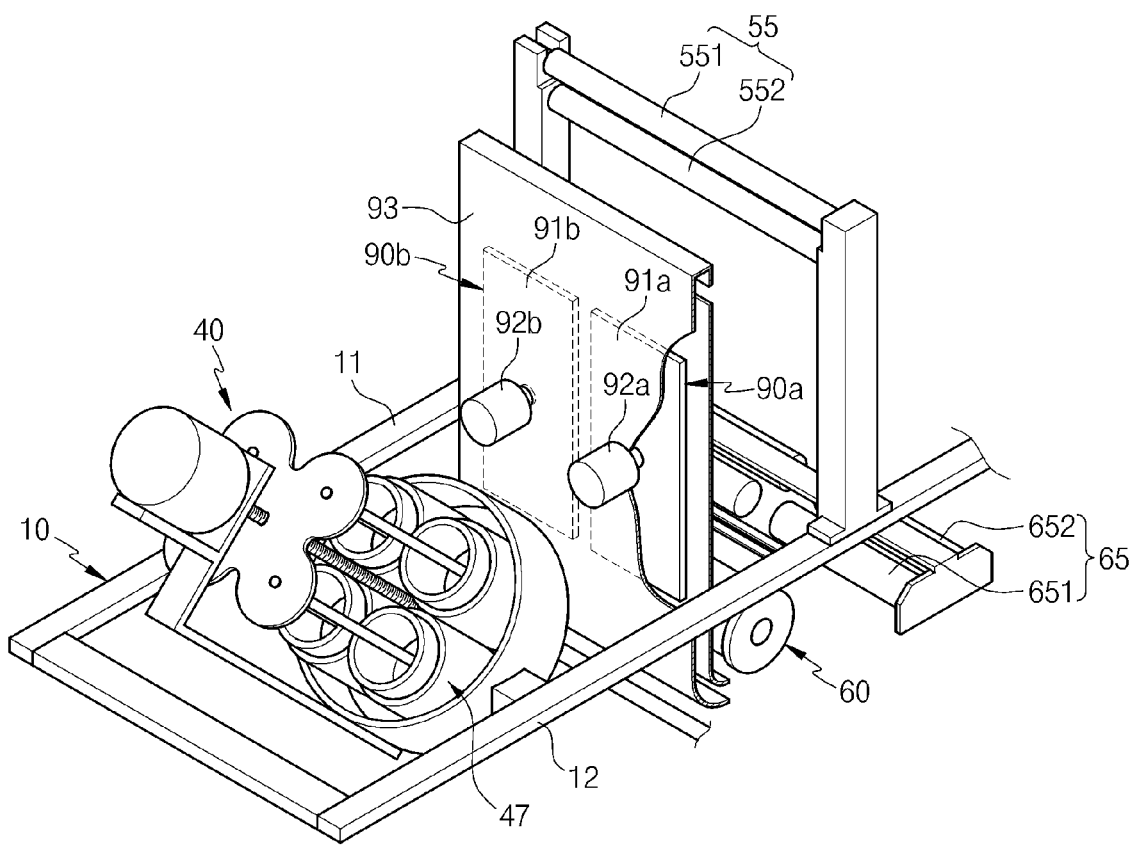
FIG. 18 is a partial cutoff perspective view for explaining a modified example of the heater of FIG. 16.

Although one heating plate 91 is provided in FIG. 16, the number of heating plate 91 is not limited thereto. For example, the bonding device 100 according to the modified embodiment includes a plurality of heaters 90a and 90b. As shown in FIG. 18, two heating plates 91a and 91b are separately disposed with a predetermined distance, which corresponds to a gap of the main secondary barrier 82, therebetween. Alternatively, the plurality of heating plates may be disposed along the moving path of the auxiliary secondary barrier within the body part 93. In the embodiment of FIG. 14, the tension adjustment unit 55 may be disposed at a height corresponding to that of an inlet of the body part 93 through which the auxiliary secondary barrier 85 enters.

Figure 19:
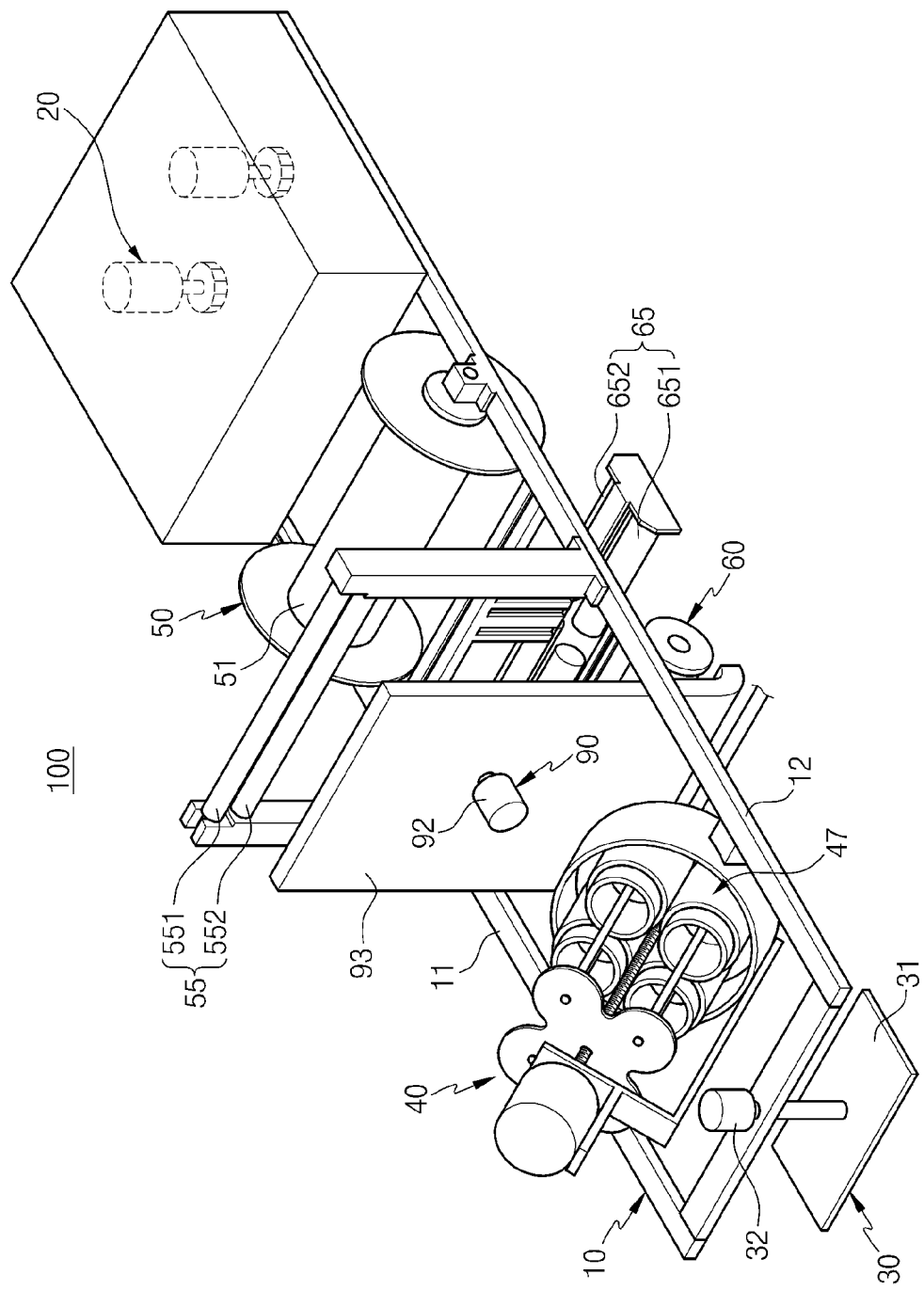
FIG. 19 is a perspective view of a device for bonding an auxiliary secondary barrier for an LNG storage tank according to further another embodiment of the present invention.

FIG. 19 is a perspective view of a device for bonding an auxiliary secondary barrier for an LNG storage tank according to further another embodiment of the present invention. The bonding device 100 of FIG. 19 includes a heating part 47 heating an adhesive contained in an adhesive applying unit 40, a first heater 30 heating an exposed portion 821 to be applied with an adhesive, and a second heater 90 heating an auxiliary secondary barrier 85 to be supplied on the adhesive.

According to the bonding device 100 of FIG. 19, a first process of heating the exposed portion 821 of a main secondary barrier 82 at a front side of an adhesive applying unit 40 by using the first heater 30 when viewed in a traveling direction of the bonding device 100, heating the adhesive embedded in the adhesive applying unit 40 by using the heating part 47, and heating the auxiliary secondary barrier 85 at a rear side of the adhesive applying unit 40 by using the second heater 90, a second process of applying the heated adhesive on the heated exposed portion 821, a third process of supplying the heated auxiliary secondary barrier 85 on the applied adhesive, and a fourth process of pressing the supplied auxiliary second barrier 85 to attach the auxiliary secondary barrier 85 to the exposed portion 821 are successively performed to firmly attach the auxiliary secondary barrier 85 to the main secondary barrier 82.

The device for bonding the auxiliary secondary barrier for the LNG storage tank according to the embodiment of the present invention may be applied to an LNG storage tank installed in a self-propulsive LNG carrying vessel or an LNG regasification vessel and an LNG storage tank installed in a floating structure such as an LNG floating production storage and offloading (FPSO) or and LNG floating storage regasification unit (FSRU).

While this invention has been particularly shown and described with reference to preferred embodiments thereof, it will be understood by those skilled in the art that various changes in form and details may be made therein without departing from the spirit and scope of the invention as defined by the appended claims.

The invention claimed is:

1. A device for bonding an auxiliary secondary barrier to exposed portions of a main secondary barrier, which are exposed between upper heat insulation boards adjacent to each other and spaced apart from each other in a liquefied natural gas (LNG) storage tank comprising a lower heat insulation board, the main secondary barrier, and upper heat insulation boards which are successively stacked between an inner hull and a primary barrier, the device comprising:

a frame;

a driving unit of which a portion is mounted on the frame, the driving unit allowing the frame to move on the upper heat insulation boards corresponding to the exposed portion of the main secondary barrier;

an adhesive applying unit mounted on the frame to apply an adhesive onto the exposed portion;

an auxiliary secondary barrier supply unit mounted on the frame to supply the auxiliary secondary barrier onto the applied adhesive; and a heater disposed on the frame to heat the auxiliary secondary barrier to be supplied on the applied adhesive, wherein the heater comprises:

a body part that is fixed to the frame, the body part having an inlet through which the auxiliary secondary barrier enters the body part, an inner space providing a moving path of the auxiliary secondary barrier inside the body part, and a discharge hole through which the auxiliary secondary barrier is discharged from the body part;

a heating plate disposed vertically within the inner space of the body part to provide heat via conduction by contacting a to-be adhered surface of the auxiliary secondary barrier inside the body part; and a press part disposed at the body part to adjust a position of the heating plate in a horizontal direction.

2. The device of claim 1, further comprising:

a heating unit disposed on the frame to heat the exposed portion.

3. The device of claim 1, wherein the adhesive applying unit comprises a heating part for heating the adhesive to be applied on the exposed portion, the adhesive applying unit applying the heated adhesive on the exposed portion.

4. The device of claim 1, wherein the auxiliary secondary barrier supply unit comprises a central shaft member winding the auxiliary secondary barrier in a roll shape and further comprises a protection sheet cartridge winding a protection sheet, which covers an edge and an outside of the auxiliary secondary barrier, in a roll shape.

5. The device of claim 1, wherein the heater is disposed at a front side of the auxiliary secondary barrier when viewed in a moving direction of the device to heat the to-be adhered surface of the auxiliary secondary barrier.

6. The device of claim 1, further comprising a press roller unit that is mounted on the frame and configured to apply a pressure to the auxiliary secondary barrier supplied on the applied adhesive, and wherein a bottom portion of the body part is bent towards a rear side with respect to a traveling direction of a bonding the device to provide the auxiliary secondary barrier discharged from the heater towards the press roller unit.

7. A device for bonding an auxiliary secondary barrier to exposed portions of a main secondary barrier, which are exposed between upper heat insulation boards adjacent to each other and spaced apart from each other in an LNG storage tank comprising a lower heat insulation board, the main secondary barrier, and upper heat insulation boards which are successively stacked between an inner hull and a primary barrier, the device comprising:

a frame;

a driving unit of which a portion is mounted on the frame, the driving unit allowing the frame to move on the upper heat insulation boards corresponding to the exposed portion of the main secondary barrier;

a first heater disposed on the frame to heat the exposed portion;

an adhesive applying unit mounted on the frame and comprising a heating part for heating an adhesive to be applied on the heated exposed portion, the adhesive applying unit applying the heated adhesive on the heated exposed portion;

an auxiliary secondary barrier supply unit mounted on the frame to supply the auxiliary secondary barrier onto the applied adhesive; and a second heater disposed on the frame to heat the auxiliary secondary barrier to be supplied onto the applied adhesive before the auxiliary secondary barrier is supplied onto the applied adhesive, wherein the second heater comprises:

a body part that is fixed to the frame, the body part having an inlet through which the auxiliary secondary barrier enters the body part, an inner space providing a moving path of the auxiliary secondary barrier inside the body part, and a discharge hole through which the auxiliary secondary barrier is discharged from the body part;

a heating plate disposed vertically within the inner space of the body part to provide heat via conduction by contacting a to-be adhered surface of the auxiliary secondary barrier inside the body part; and a press part disposed at the body part to adjust a position of the heating plate in a horizontal direction.

* * * * *